Jan. 27, 1970 T. G. HESSELGREN 3,492,650
MATRIX FOR PRODUCING ELECTRIC PULSES
Filed July 6, 1965
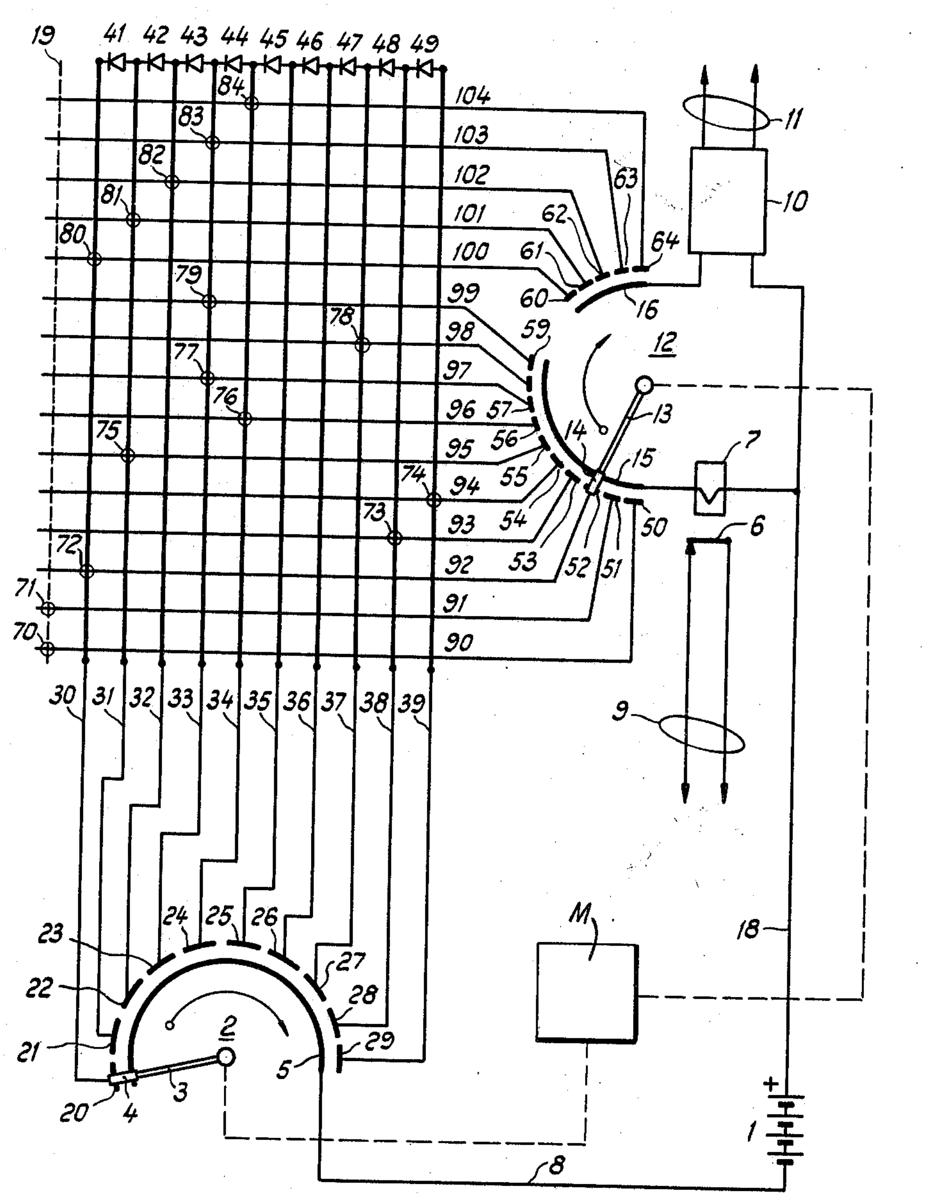
INVENTOR
TORE G. HESSELGREN
BY Strauch, Nolan, Neale, Nies & Bramaugh
ATTORNEYS United States Patent Office 3,492,650 Patented Jan. 27, 1970

3,492,650

MATRIX FOR PRODUCING ELECTRIC PULSES

Tore Gottfrid Hesselgren, Borensvagen 1, Johanneshov, Stockholm, Sweden

Filed July 6, 1965, Ser. No. 469,423
Int. Cl. H04q 3/00
U.S. Cl. 340—166 5 Claims

ABSTRACT OF THE DISCLOSURE

A device comprising a chain of rectifiers connected in series and poled in the same direction with junctions ahead of the first rectifier and after the last rectifier and between each pair of adjacent rectifiers. The device also includes a first set of conductors equal in number to the number of junctions with a different one of the conductors connected to each junction and a rotary switch having an operating cycle in which it connects the conductors one after the other to one side of an electrical power source. In addition the device includes a second set of conductors and a rotary switch which connects the conductors of the second set one after the other to the other side of the power source such that all of the conductors in the first set are connected seriatim to the power source during the period that each of the conductors in the second set is connected to the power source.

This invention relates to means for producing electric pulses and more particularly to means for producing trains of pulses with a predetermined number of pulses in each train.

The invention is particularly although not exclusively intended for use in signal transmitters in automatic supervision systems, e.g. such systems that are used for the supervision of buildings in order to effect a signal transmission to a central supervision station in the case of fire, burglary or stops and faults in machinery located in the building. At the supervised places are provided detecting means, e.g. contact thermometers, contact manometers, limit switches, thermostats, photocell-devices or other electric contact means which are so arranged that they are actuated and cause the signal transmitter to become operative when something occurs on which information should be sent to the central supervision station.

The signal transmitters may be connected to the receiving station over a public telephone network with automatic switching. In such case both the signal transmitter and the receiving station are connected to an automatic telephone exchange over ordinary subscribers' lines. Thus, when the signal transmitter is started, it should first transmit switching signals which actuate the telephone exchange to cause it to establish a connection between the transmitter and the receiving station. Over the connection thus established the transmitter then sends message signals which indicate e.g. the identity of the transmitter and/or the nature of the fault or other incident which initiated the signalling. The switching signals consist of a number of pulse trains, each pulse train representing a digit in the number allotted to the receiving station. The message signals preferably consist of trains of audio frequency pulses.

In a signalling system of this kind a pulse producing device must be provided which should be capable of producing a plurality of pulse trains with a predetermined number of pulses in each train.

It is an object of the invention to provide a pulse producing device in which the number of pulses in each pulse train can be set beforehand to any number up to a certain maximum number.

Devices for this purpose are previously known in which cyclically operating switches in series with a voltage source are connected in a circuit which is alternatively closed and interrupted upon operation of the switch so that a train of pulses is generated in the circuit during each operating cycle. The cylically operating switch may be designated in many different ways. It may e.g. comprise a rotating cam disc which actuates a contact in the pulse circuit or a rotating contact arm which coacts with fixed contact segments, or of a rotating disc or cylinder and contact brushes coacting with contact segments provided on the disc or cylinder. Several switches of this kind producing pulse trains having different numbers of pulses may be so arranged that they can be connected optionally into the circuit, whereby the device can be set beforehand to produce a pulse train having the desired number of pulses. Such a device is however complicated and space-consuming. It is possible to simplify this device to some extent by letting certain parts be common to several switches. Thus, a plurality of switches may have a common rotating disc provided with appropriately arranged contact segments with which separate fixed brushes coact so that during each revolution of the disc different numbers of makes and breaks are effected between different pairs of brushes. However, even this simplified device requires a large number of contact brushes, which is a drawback since the contact brushes require much space and must be made with great precision and carefully adjusted in order that the device shall work satisfactorily.

The novel pulse producing device provided by the present invention is considerably simpler than these known devices, since in the novel device only one cyclically operating switch is required for the pulse generation.

According to the invention the device comprises a rectifier chain which consists of a plurality of rectifiers connected in series and poled in the same direction and which is provided with a plurality of taps. A cyclically operating switch is arranged to connect these taps successively to a connection to one pole of a direct current source. Furthermore means are provided for connecting optionally any of the taps to a connection to the other pole of the direct current source.

Thus, the other pole of the direct current source is connected directly or over a utilization apparatus to one of the taps on the rectifier chain and also connected over one or more of the rectifiers of the rectifier chain to all the other taps. When the cyclically operating switch successively connects these taps to the firstmentioned pole of the direct current source, a circuit will be completed upon each connection from one pole of the direct current source over the switch and one of said taps and one or more or none of the rectifiers to the second pole of the direct current source. Those rectifiers which are situated at one side of the tap which is directly connected to the second pole of the current source will present their low forward resistance to the current in the circuit, while those rectifiers which are situated at the other side of said tap will present their very high back resistance to the current through the circuit. When during its operating cycle the switch connects one pole of the direct current source to the tap connected directly to the other pole of the current source and to those taps which are situated at one side of this tap current will flow in the circuit, while no or a very weak current will flow through the circuit when the switch connects the other taps. Thus, during one operating cycle of the switch pulses are produced in the circuit in a number depending on which of the taps of the rectifier chain is directly connected to the second pole of the direct current source.

The invention will be described more in particular in conjunction with the accompanying drawing, which shows schematically an embodiment of the invention intended for use in a signalling system which when started automatically calls a receiving station over a telephone exchange and when the connection with the receiving station has been established sends message signals.

Referring now to the drawing 1 designates a direct current source. The negative pole of the direct current source is connected by means of conductor 8 to a cyclically operating switch designated 2. Switch 2 comprises a rotating arm 3 which carries a contact brush 4 at its free end, and a number of contact segments 20–29 which are attached to a fixed support and arranged in an arc the centre of which coincides with the centre of rotation of arm 3. An additional contact segment 5 extends concentrically with and at a certain radial distance from segments 20–29. Conductor 8 is connected to contact segment 5. When the contact arm 3 rotates, the contact brush 4 successively connects the segments 20–29 with segment 5.

The contact segments 20–29 are connected by individual conductors 30–39 to different taps on a rectifier chain consisting of rectifiers 41–49, which are connected in series and poled in the same direction.

At least for part of their lengths the conductors 30–39 extend in parallel with each other and are situated in the same plane. In a second plane which is parallel to the first mentioned plane, conductors 90–99 and 100–104 are disposed in parallel with each other but at an angle (preferably at right angles) to conductors 30–39. Each of the conductors 90–99 and 100–104 is connected to an individual contact segment 50–59 and 60–64 respectively in a second cyclically operating switch 12. This switch has a rotating arm 13 carrying a contact brush 14 which during the rotation of arm 13 successively connects segments 50–59 with segment 15 and segments 60–64 with an additional segment 16. Contact segment 15 is connected to the positive pole of the direct current source 1 over a circuit which includes a relay 7. The contact segment 16 is connected to the positive pole of direct current source 1 over a second circuit, which includes an oscillator 10.

For each of conductors 90–99 and 100–104 there is provided a manually operable contact member by means of which the conductor can be connected to any one of the tap conductors 30–39 from the rectifier chain 41–49. These contact members are only schematically indicated on the drawing by means of rings 70–79 and 80–84. The contact members may e.g. consist of plugs which can be inserted in the crossing points between conductors 90–104 and conductors 30–39 so that the plug effects a connection between the two conductors which cross each other in the respective crossing point. The contact members may also consist of sliding contacts which are displaceable along conductors 90–104 and are provided with contact surfaces which may be caused to make contact with anyone of conductors 30–39 by displacing the contact member.

The rotational speed of contact arm 13 of switch 12 is so chosen in relation to the rotational speed of contact arm 3 of switch 2 that contact brush 4 of switch 2 can sweep over all contact segments 20–29 while contact brush 14 of switch 12 sweeps over one of the contact segments 50–64.

Assuming now that contact members 70–84 are set in the positions indicated on the drawing, the device operates in the following manner.

When the device is started contact brush 14 of switch 12 first slides over segment 50 and at the same time contact brush 4 of switch 2 slides over all segments 20–29. However, during this operating cycle no pulses are produced for conductor 90 which is connected to segment 50, is not in connection with any of conductors 30–39 since the contact member 70 allotted to conductor 90 is set in such a position (indicated by the dotted line 19) that it is not in contact with any of conductors 30–39. Nor are any pulses produced when brush 14 then slides over segment 51, for the conductor 91 associated with segment 51 is not connected to any of conductors 30–39 either, since the corresponding contact member 71 also is in an ineffective position.

Contact brush 14 then proceeds to segment 52. The conductor 92 associated with segment 52 is connected by means of contact member 72 to conductor 30 which is connected to segment 20 of switch 2. When contact brush 4 of switch 2 slides over segment 20, the following circuit is therefore completed; a positive pole of current source 1–conductor 18–relay coil 7–segment 15–brush 14–segment 52–conductor 92–contact member 72–conductor 30–segment 20–brush 4–segment 5–conductor 8–negative pole of direct current source 1. In this circuit current will flow as long as brush 4 is in contact with segment 20.

When contact brush 4 comes subsequently in contact with segment 21 another circuit is completed which extends from the positive pole of current source 1 up to conductor 30 in the same manner as the circuit previously described but then proceeds over rectifier 41–conductor 31–segment 21–brush 4 and therefrom along the same path as the circuit previously described. In the circuit now completed rectifier 41 is included, and this rectifier is so poled in relation to the current source that current cannot flow through the circuit. When contact brush 4 then runs over the remaining segments 22–29 while contact brush 14 is still in contact with segment 52, no pulses will be produced either, because during the continued rotation of brush 4 a successively increasing number of rectifiers presenting their back resistance are connected into the pulse circuit. Thus, during the operating cycle when brush 14 is in contact with segment 52 only one pulse will be produced.

Contact brush 14 now proceeds to segment 53. The conductor 93 associated with segment 53 is connected by contact member 73 to conductor 38 which in turn is connected to contact segment 28 of switch 2. When brush 4 now makes contact with segment 20, the following circuit is completed: Positive pole of current source 1–circuit elements 18, 7, 15 and 14–segment 53–conductor 93–contact member 73–conductor 38–rectifiers 48, 47 . . . 41–conductor 30–segment 20–circuit elements 4, 5, 8–negative pole of current source 1. The rectifiers 48, 47 . . . 41 included in this circuit are so poled in relation to the current source that current can flow through the circuit. Thus a pulse is produced when brush 4 slides over segment 20. Pulses are also produced when brush 4 slides over segments 21–28. However, when the brush 4 then slides over segment 29 no pulse is produced, because in the circuit then completed rectifier 49 is included presenting its back resistance to the voltage of the direct current source. During the operating cycle when brush 14 is in contact with segment 53 a total of nine pulses is thus produced.

When brush 14 slides over the following segments 54–59 pulse trains are produced in analogous manner with a number of pulses amounting to 10, 2, 5, 4, 8 and 4 respectively.

The pulse trains produced when brush 14 slides over segments 50–59 actuate relay 7. This relay is provided with a break contact 6 connected into a telephone line 9 which is assumed to be connected to an automatic telephone exchange. The said pulse trains are thus utilized as switching signals to cause the exchange to establish a connection to the desired receiving station. The number of pulses in each pulse train corresponds in known manner to a digit in a call number allotted to the receiving station. Assuming that one pulse corresponds to digit 0, two pulses correspond to digita 1, three pulses to digit 2 and so on, the eight-digit number 08914373 is dialled if the contact members 70–79 are set as shown in the drawing.

Since the shown embodiment includes a total of ten contact members (70–79) for the number setting, this embodiment can be used for dialling numbers having up to ten digits.

When during the continued rotation of arm 13 contact brush 14 of switch 12 slides over contact segments 60–64 additional pulse trains are produced, the number of pulses in each train being determined by the setting of contact members 80–84. If these contact members are set in the positions shown in the drawing, the number of pulses in these pulse trains will be 1, 2, 3, 4 and 5 respectively. These pulse trains are utilized to control an audio frequency oscillator 10. The output circuit 11 of oscillator 10 is connected in a manner not shown to telephone line 9 so that the pulse modulated audio frequency signals outgoing from the oscillator are transmitted to the receiving station. These signals are utilized as message signals.

The signalling system can be provided with means for automatically stopping switches 2 and 14 when all the switching signals have been set, that is when brush 14 has passed segment 59, and starting the switches again only if a response signal arrives from the receiving station. Hereby it is ensured that the connection to the receiving station is actually established before the message signals are transmitted. Such means however lie outside the scope of the invention and will not be described in detail.

The rectifiers 41–49 are preferably of the dry contact type, e.g. germanium diodes. A rectifier has a certain resistance even in its forward direction. Since in the device according to the invention different members of rectifiers are involved in the production of different pulses in one and the same pulse train, the pulses of a pulse train will have slightly different amplitudes. In the embodiment shown in the drawing the first pulse in a train of several pulses will have the least amplitude and the last pulse will have the largest amplitude. Therefore, the pulse utilization devices (relay 7 and oscillator 10) should have such a sensitivity that they respond in the same way to pulses of different amplitudes exceeding a certain minimum level. In order to reduce the differences in amplitude between different pulses the rectifiers 41–49 or at least some of them may consist of several rectifier elements connected in parallel whereby the resistance is reduced.

In a preferred embodiment of the device shown schematically in the drawing the contact segments of the switches 2 and 12 and most of the conductors are made in the form of printed circuits on a plate of insulating material. The rotating arms 3 and 13 are driven over appropriate gearings by a common motor M. The shafts of arms 3 and 13 are concentric, that is one shaft is hollow and encloses the other shaft. The contact segments of one switch are printed on one side of the plate, and the segments of the other switch are printed on the opposite side of the plate.

I claim:

1. A device for producing in each operating cycle thereof a train of electrical pulses which consists of a plurality of pulse groups, comprising: a rectifier chain comprising a plurality of rectifiers, said rectifiers being connected in series and being poled in the same direction; means providing junctions ahead of the first rectifier of said chain, after the last rectifier therein, and between each pair of adjacent rectifiers; a first set of conductors equal in number to the number of junctions, a different one of said conductors being connected to each of said junctions; means having an operating cycle in which it connects the conductors of said first set one after the other to one side of an electrical power source; a second set of conductors; manually and selectively adjustable means for connecting each of the conductors in said second set to any one of the conductors in the first set; and means having an operating cycle in which it connects the conductors of said second set one after the other to the other side of said power source, the means for connecting said first set of conductors to said one side of said power source being so related to the means for connecting the second set of conductors to the other side of the power source that all of the conductors in the first set are connected seriatim to said one side of the power source during the period that each of the conductors in the second set is connected to the other side of the power source, the number of pulses in the group thereof produced while a conductor of said second set is connected to said other side of said power source thereby being equal to the number of junctions ahead of the first rectifier in the rectifier chain behind the junction associated with that conductor of the first set connected to said conductor of the said second set, whereby the number of pulse groups in the pulse train is equal in number to the number of conductors in said second set with the numbers of pulses in each group not exceeding a number equal to the number of conductors in said first set depending upon the connections between the conductors of the first set and the conductors of the second group made by said manually and selectively adjustable connecting means.

2. The device of claim 1, wherein the manually adjustable connecting means includes means which permits the connections between said first conductors and said second conductors to remain uncompleted during the periods that selected ones of said conductors are connected to said other side of said power source, whereby no pulses will be produced during said periods.

3. The device of claim 1, wherein the means for connecting the first set of conductors seriatim to said one side of said power source comprises a first cyclically operating switch means and the means for connecting the conductors of said second set seriatim to said other side of said power source comprises a second cyclically operating switch means, said first and second switch means each comprising a plurality of stationary contacts, each connectable to a different one of the conductors in the set thereof associated with the switching means, and a movable contact means connectable to said power source for electrically connecting said contacts to said source; and wherein said device further comprises a single motor means for effecting movement of both of said movable contact means.

4. The device of claim 1, together with a third set of conductors; manually and selectively adjustable means for connecting each of the conductors in said third set to any one of the conductors in said first set; the means for connecting the conductors of the second set to said other side of said power source comprising means for connecting the conductors of said third set one after the other to said other side of said power source after the last of the conductors in the second set is connected thereto; the means for connecting said first set of conductors to said one side of said power source being so related to the means for connecting the third set of conductors to the other side of the power source that all of the conductors in the first set are connected seriatim to said one side of the power source during the period that each of the conductors in the third set is connected to the other side of the power source, whereby a pulse group as aforesaid is generated during the period that each of the conductors in the third set thereof is connected to said other side of said source; and means for transmitting the pulse groups generated while the conductors of said third group are connected to said other side of said power source, whereby said device is capable of transmitting information in numerically coded form.

5. The device of claim 4, wherein said transmitting means is an audio frequency oscillator.

(References on following page)

References Cited

UNITED STATES PATENTS

| | | | |
|---|---|---|---|
| 3,021,392 | 2/1962 | Wrede et al. | 340—365 X |
| 3,074,059 | 1/1963 | Flavan | 340—365 |
| 3,111,562 | 11/1963 | Shoji | 340—365 X |
| 1,972,289 | 9/1934 | Chanveau | 340—166 |
| 2,398,771 | 4/1946 | Compton | 340—166 |
| 2,873,439 | 2/1959 | Lahti et al. | 340—176 X |

JOHN W. CALDWELL, Primary Examiner

HAROLD I. PITTS, Assistant Examiner

U.S. Cl. X.R.

179—5, 18, 90; 340—176